United States Patent
Rosenberg et al.

(10) Patent No.: US 8,032,482 B2
(45) Date of Patent: Oct. 4, 2011

(54) METHOD, SYSTEM, AND APPARATUS FOR PROVIDING A DOCUMENT PREVIEW

(75) Inventors: Jonathan Paul Rosenberg, Issaquah, WA (US); Rhae-Christie Shaw, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 83 days.

(21) Appl. No.: 10/954,328

(22) Filed: Sep. 30, 2004

(65) Prior Publication Data

US 2006/0074869 A1 Apr. 6, 2006

(51) Int. Cl.
G06F 7/00 (2006.01)
G06F 17/00 (2006.01)

(52) U.S. Cl. .............. 707/602; 707/999.002; 715/273; 715/212

(58) Field of Classification Search .............. 707/2, 3, 707/602; 715/526, 804, 212, 256, 273
See application file for complete search history.

(56) References Cited

U.S. PATENT DOCUMENTS

| | | | |
|---|---|---|---|
| 5,307,086 A | 4/1994 | Griffin et al. ............... | 345/808 |
| 5,579,466 A | 11/1996 | Habib et al. ............... | 715/529 |
| 5,640,580 A | 6/1997 | Slayden et al. ............. | 715/527 |
| 5,652,901 A | 7/1997 | Slayden et al. ............. | 715/527 |
| 5,680,629 A | 10/1997 | Slayden et al. ............. | 715/527 |
| 5,694,610 A | 12/1997 | Habib et al. ............... | 715/531 |
| 5,818,447 A | 10/1998 | Wolf et al. | |
| 5,835,084 A * | 11/1998 | Bailey et al. ............... | 715/783 |
| 5,838,320 A | 11/1998 | Matthews, III et al. ....... | 345/786 |
| 5,845,293 A * | 12/1998 | Veghte et al. ............... | 707/202 |
| 5,903,905 A * | 5/1999 | Andersen et al. ............. | 715/526 |
| 6,008,806 A * | 12/1999 | Nakajima et al. ............. | 715/744 |
| 6,034,687 A * | 3/2000 | Taylor et al. ................. | 715/775 |
| 6,098,090 A * | 8/2000 | Burns ......................... | 718/107 |
| 6,134,566 A * | 10/2000 | Berman et al. ............... | 715/526 |
| 6,160,554 A * | 12/2000 | Krause ......................... | 715/804 |
| 6,405,225 B1 | 6/2002 | Apfel et al. | |
| 6,616,702 B1 | 9/2003 | Tonkin | |
| 6,734,883 B1 | 5/2004 | Wynn et al. .................. | 345/830 |
| 6,944,819 B2 * | 9/2005 | Banatwala et al. ........... | 715/526 |
| 7,017,073 B2 * | 3/2006 | Nair et al. ..................... | 714/11 |
| 7,113,934 B2 * | 9/2006 | Levesque et al. ............. | 707/1 |

(Continued)

FOREIGN PATENT DOCUMENTS

DE 198 00 423 A1 7/1998

(Continued)

OTHER PUBLICATIONS

Copending U.S. Appl. No. 10/993,950 entitled "Method and Computer-Readable Medium for Navigating Between Attachments to Electronic Mail Messages," filed Nov. 19, 2004.

(Continued)

Primary Examiner — John E Breene
Assistant Examiner — Joshua Bullock (57) ABSTRACT

A method and apparatus are provided for generating a document preview. According to the method, a preview handler provides an interface to one or more previewers. The previewers are software components capable of generating a visual preview for one or more document types. In response to a request from a host application to generate a preview for a document, the preview handler is operative to identify the appropriate previewer for generating a preview for the document. The preview handler may then call the previewer and instruct the previewer to load the document and to show the preview in a sub-window of a window provided by the calling host application.

26 Claims, 7 Drawing Sheets

U.S. PATENT DOCUMENTS

| | | | |
|---|---|---|---|
| 7,243,298 | B2 | 7/2007 | Yozell-Epstein et al. |
| 7,353,232 | B1 | 4/2008 | Kalucha et al. |
| 7,647,559 | B2 | 1/2010 | Yozell-Epstein et al. |
| 2003/0076322 | A1 | 4/2003 | Ouzts et al. .................. 345/440 |
| 2003/0101383 | A1* | 5/2003 | Carlson ......................... 714/42 |
| 2004/0054737 | A1 | 3/2004 | Daniell ........................ 709/206 |
| 2004/0068545 | A1 | 4/2004 | Daniell et al. ................ 709/206 |
| 2004/0158607 | A1 | 8/2004 | Coppinger et al. |
| 2004/0189695 | A1* | 9/2004 | Kurtz et al. .................. 345/738 |
| 2004/0193599 | A1 | 9/2004 | Liu et al. ........................... 707/7 |
| 2004/0205625 | A1* | 10/2004 | Banatwala et al. ........... 715/526 |
| 2004/0205633 | A1 | 10/2004 | Martinez et al. |
| 2004/0260756 | A1 | 12/2004 | Forstall et al. |
| 2005/0010860 | A1 | 1/2005 | Weiss et al. |
| 2005/0117032 | A1 | 6/2005 | Ueda et al. ................. 348/231.4 |
| 2005/0192974 | A1* | 9/2005 | DeLorme et al. ............. 707/100 |
| 2005/0235203 | A1 | 10/2005 | Undasan |
| 2005/0246643 | A1 | 11/2005 | Gusmorino et al. |
| 2006/0031336 | A1 | 2/2006 | Friedman et al. ............. 709/206 |
| 2006/0031775 | A1 | 2/2006 | Sattler et al. .................. 715/769 |
| 2006/0036558 | A1 | 2/2006 | Moore et al. |
| 2006/0075046 | A1 | 4/2006 | Yozell-Epstein et al. |
| 2006/0224937 | A1 | 10/2006 | Sudoh et al. .................. 715/500 |
| 2007/0297029 | A1 | 12/2007 | Low et al. |
| 2010/0095224 | A1 | 4/2010 | Yozell-Epstein et al. |

FOREIGN PATENT DOCUMENTS

| | | |
|---|---|---|
| EP | 1 182 600 A2 | 2/2002 |
| GB | 2 237 581 A | 9/2000 |
| JP | 10-247156 | 9/1998 |
| JP | 10-320390 | 12/1998 |
| JP | 2002-278899 | 9/2002 |
| JP | 2003-330355 | 11/2003 |
| JP | 2004-199700 | 7/2004 |
| ZA | 2003/06968 A | 6/2004 |

OTHER PUBLICATIONS

European Communication mailed Mar. 28, 2006 cited in EP Application No. 05107772.5-2221.

European Communication mailed Mar. 29, 2006 cited in EP Application No. 05105464.1.

U.S. Office Action dated Nov. 16, 2006 cited in U.S. Appl. No. 10/955,361.

Nan Barber et al., Office X for Macintosh: The Missing Manual, O'Reilly Publishing, Jul. 2002.

U.S. Office Action dated Aug. 8, 2007 cited in U.S. Appl. No. 10/993,950.

Olsen, J.W. "Best Outlook Add-Ins and Helpers", Sep. 14, 2004. www.windowsdevcenter.com/pub/a/windows/2004/09/14/Outlook_Addins.html.

PR Newswire. "X1 Brings Instantaneous Search to Email, Attachments and PC Files", Feb. 18, 2004.

European Search Report dated Aug. 23, 2007 cited in EP Application No. 05105348.6—1243.

Anonymous: "Newest Release of Verity KeyView Viewing Software Development Kits Now Available," Verity Press Release, Sep. 27, 2004, XP-002447751, http://www.autonomy.com/content/News/Releases/2004/V0927.en.html.

Anonymous: "Verity KeyView Viewing Sdk Guide—Version 8.0" Verity KeyView Documentation, No. DE0156, dated May 28, 2004, XP007902819.

Anonymous: "Netscape Gecko Plug-ins—API Reference—Version 2.0," Netscape Documentation, Aug. 2002, XP007902820 URL:http://devedee-temp.mozilla.org/library/manuals/2002/plugin/1.0/plugin.pdf.

Correspondence from the Japanese Patent Office regarding Japanese Patent Application No. 2005-183578 dated Mar. 7, 2008.

Correspondence from the Japanese Patent Office regarding Japanese Patent Application No. 2005-183578 dated Dec. 9, 2008.

Koyama, Takahiro, "Through Comparison, E-mail Software Best-often Competition," Window 2000 World, vol. 8, No. 2, pp. 199-211, IDG Japan, Inc., Japan, Feb. 1, 2003.

Hiraki, A. Itaru, "Integrated Sofware for Mobile Computing: Mobilesiute," Fujitsu, vol. 50, No. 5, pp. 334-337, Fujitsu Limited, Japan, Sep. 10, 1999.

Esposito, D., "More Windows 2000 UI Goodies: Extending Explorer Views by Customizing Hypertext Template Files", MSDN Magazine, Jun. 2000.

Hobona et al., "Enhancing Data Discovery Using the ArcSDE Java API", ESRI International User Conference 2004, available at http://gis.esri.com/library/userconf/proc04/docs/pap1840.pdf.

Taylor, Owen, "A new file selector for GTK+",2003, available at http://people.redhat.com/otaylor/fosdem2003/file-selector.html#introduction.

Sonnino et al., "FileSnoop 2: Safe & Efficient Windows Exploring", PCMAG.COM, Apr. 20, 2004, available at http://www.pcmag.com/article2/0,1895,1571719,00.asp?kc=PCGL10310KTX2B2200331.

European Patent Office Communication regarding Application No. 05 105 348.6 dated Jan. 5, 2010, 37 pages.

Office Action from the European Patent Office regarding Application No. 05105348.6 dated Apr. 25, 2008.

Office Action from the Patent Office of the State Intellectual Property Office of the People's Republic of China regarding Application No. 200510089509.9 dated May 9, 2008.

Office Action from the Australian Patent Office regarding Application No. 2005202723 dated Aug. 11, 2010.

Office Action from the United States Patent and Trademark Office regarding U.S. Appl. No. 10/993,950 dated May 1, 2008.

Office Action from the United States Patent and Trademark Office regarding U.S. Appl. No. 10/993,950 dated Dec. 23, 2008.

Office Action from the Patent Office of the State Intellectual Property Office of the People's Republic of China regarding Application No. 200510099654.5 dated Feb. 12, 2010.

Office Action from the Patent Office of the State Intellectual Property Office of the People's Republic of China regarding Application No. 200510099654.5 dated Jul. 29, 2010.

Office Action from the Australian Patent Office regarding Application No. 2005203710 dated Aug. 12, 2009.

Office Action from the Australian Patent Office regarding Application No. 2005203710 dated Dec. 18, 2009.

Office Action from the European Patent Office regarding Application No. 05105464.1 dated Apr. 12, 2007.

Office Action from the Patent Office of the State Intellectual Property Office of the People's Republic of China regarding Application No. 200510088513.3 dated May 9, 2008.

Office Action from the Australian Patent Office regarding Application No. 2005202716 dated Aug. 12, 2009.

Office Action from the Australian Patent Office regarding Application No. 2005202716 dated Dec. 18, 2009.

Office Action from the Mexican Patent Office regarding Application No. Pa/a/2005/007080 dated May 29, 2008.

Office Action from the Patent Office of the Russian Federation regarding Application No. 2005120370 dated Jul. 10, 2009.

Office Action from the Patent Office of the Russian Federation regarding Application No. 2005130357 dated Aug. 6, 2009.

Office Action from the Patent Office of the Russian Federation regarding Application No. 2005120362 dated Jul. 7, 2009.

Office Action from the Japan Patent Office regarding Japanese Patent Application No. 2005-0183574 dated Jan. 14, 2011.

Office Action from the United States Patent Office regarding U.S. Appl. No. 12/639,406 dated Jan. 11, 2011.

Office Action from the United States Patent Office regarding U.S. Appl. No. 11/473,435 dated Aug. 21, 2008.

Office Action from the United States Patent Office regarding U.S. Appl. No. 11/473,435 dated Mar. 24, 2009.

Office Action from the United States Patent Office regarding U.S. Appl. No. 11/473,435 dated Sep. 17, 2009.

Office Action from the United States Patent Office regarding U.S. Appl. No. 11/473,435 dated May 14, 2010.

Office Action from the Japan Patent Office regarding Japanese Patent Application No. 2005-275755 dated Apr. 8, 2011, 2 pages.

Kengo Inoue, "Supporting the start of new life, third, email/basic of BASIC," JUST MOAI, No. 132, p. 21, JustSystems Corporation, Japan, May 15, 2000, 7 pages.

Munechika Nishida, "Speedy mail software whose cooperation with the mobile phone or WorkPad is attractive, Shuriken Pro JustSystems," ASAHI Personal Computer, No. 264, pp. 100 and 101, The Asahi Shimbun Company, Japan, Apr. 15, 2000, 4 pages.

Office Action from the United States Patent Office regarding U.S. Appl. No. 11/473,435 dated May 27, 2011.

* cited by examiner

METHOD, SYSTEM, AND APPARATUS FOR PROVIDING A DOCUMENT PREVIEW

CROSS-REFERENCE TO RELATED APPLICATIONS

This patent application is related to concurrently filed U.S. patent application entitled "Method And Computer-Readable Medium For Previewing And Performing Actions On Attachments To Electronic Mail Messages" which is expressly incorporated herein by reference.

BACKGROUND OF THE INVENTION

When using a computer system having a modern graphical operating system, it is often desirable to view a preview of a document. A document preview is a read-only rendering of a document that mimics what a user would have seen if the document was opened with an application program associated with the document. Some application programs allow a user to view a static image of a document, but the static image is not a true preview that the user can page through or navigate. Other programs require a user to launch an application program associated with the document to view its contents. For instance, within an electronic mail ("e-mail") client application program, it is sometimes desirable to view a preview of one or more documents attached to an e-mail message. Current e-mail application programs, however, require a user to launch the application associated with the attached document to view the document. This process can be time consuming and frustrating for a user.

It is also desirable to view a document preview within various contexts. For instance, it may be desirable to view a document preview from within the context of an application program, such as the e-mail client application program described above. It also may be desirable to view a document preview from within the context of an operating system program, such as a graphical desktop shell. For instance, when a user utilizes the shell to navigate to a folder containing documents, it may be desirable for the user to quickly view a preview of the documents without the need to launch an associated application program. Similarly, it may be desirable to quickly view a document preview in the context of a dialog box utilized for opening files. In this manner, a user could view a document preview and quickly examine the contents of the document without the need to open an application program associated with the document. However, in order to preview documents utilizing current systems, each application program and operating system must implement their own code for previewing documents.

It may also be desirable to provide a facility for quickly previewing documents within various contexts without affecting the responsiveness of the computer system. Moreover, any errors encountered when previewing a document should not impact the performance or stability of a host operating system or application. It is with respect to these considerations and others that the various embodiments of the present invention have been made.

BRIEF SUMMARY OF THE INVENTION

In accordance with the embodiments of the present invention, the above and other problems are solved by a method, system, and apparatus for providing a document preview. The embodiments of the invention provide a common facility that may be utilized by operating system programs and application programs to provide a quick preview of a document without launching an application program associated with the document. The facilities provided by the various embodiments of the invention allow a preview to be paged through and navigated. The embodiments also provide a preview facility that does not severely impact computer system performance or stability.

According to one aspect of the invention, a method is provided for generating a document preview. According to the method, a preview handler is provided that exposes a preview handler interface that is callable by host applications desiring to display a preview of a document. For instance, an e-mail client application may comprise a host application and may call the preview handler interface to display a preview of a document attached to an e-mail message. Through the preview handler interface, the preview handler is operative to identify a previewer for displaying a preview of the document, for loading the previewer, and for instructing the previewer to build and display the preview.

In order to build and display a preview, the host application may call the preview handler interface with a request to load a document to be previewed. The request may include a path to the document and a handle to a window in which the preview should be displayed. In response to receiving the request, the preview handler may identify the appropriate previewer to generate the preview for the document. The previewer may be identified by querying an optional interface provided by the host application, by searching a registry for registered previewers, or by other means.

Once a previewer has been identified for the document type, the preview handler may call an interface exposed by the previewer to instruct the previewer to load the document. The preview handler may also call the previewer interface to show the preview of the document within a sub-window of the window identified by the host application. The previewer may be executed in a separate process space so as not to impact the performance of the host application. For similar reasons, communication between the preview handler and the previewer may occur on a background thread.

A number of optional interfaces may be implemented by the host application for use by the previewer. In particular, a beaconing interface may be provided by the host application through which the previewer may query the host application for permission to load supporting files necessary to generate the preview of the document. A progress interface may be implemented by the host application through which the previewer may provide a progress indicator, such as the progress of loading the document and generating the preview. An interface may also be provided through which the previewer may obtain an interface for locating additional files necessary to generate the preview of the document.

Embodiments of the invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
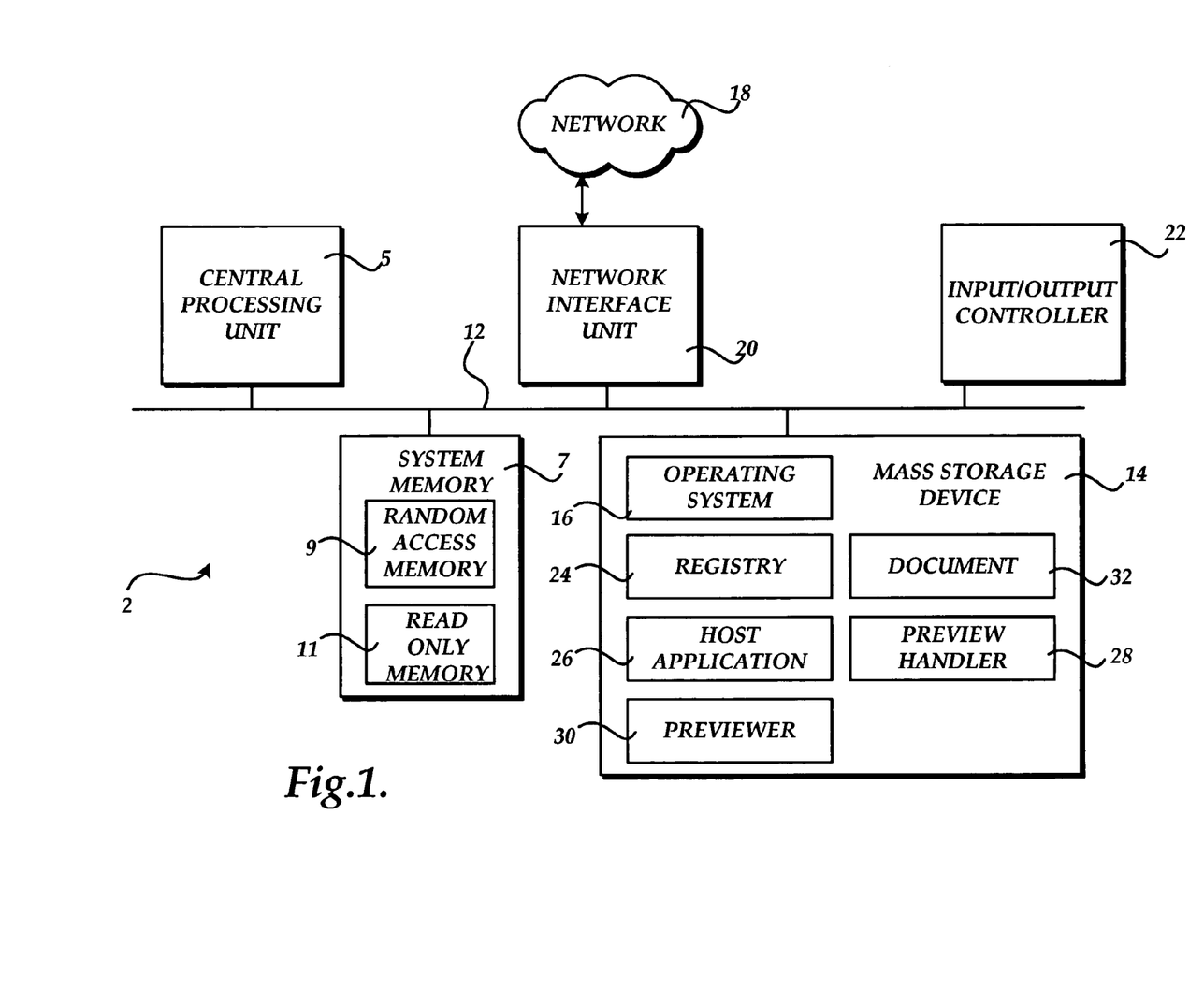
FIG. 1 is a computer system architecture diagram illustrating a computer system utilized in and provided by the various embodiments of the invention.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a host application 26. The host application 26 comprises any type of program that desires to provide a preview of a document 32 to a user. According to embodiments of the invention, the host application 26 comprises the OUTLOOK personal information manager application program from MICROSOFT CORPORATION. Through the various embodiments of the invention, previews may be generated and displayed for documents attached to e-mail messages. It should be appreciated, however, that the host application 26 may comprise a word processor application program, a spreadsheet application program, a presentation application program, the operating system 16, or any other type of program. These programs may utilize the facilities described herein, for instance, for providing a document preview in a file open dialog box, within an operating system shell, or in any other location.

The mass storage device 14 and the RAM 9 are also operative to store a preview handler program 28. The preview handler 28 is a facility for providing previews of documents. As will be described in greater detail below, the preview handler 28 implements an interface that applications such as the host application 26 may call to generate a document preview. Provision of the document preview is abstracted from the host application 26 by the interface provided by the preview handler 28.

According to the embodiments of the invention, the preview handler 28 may utilize one or more previewer programs 30 to generate the actual preview of the document 32. The previewers may register with the preview handler 28, the host application 26, or the operation system 16 as previewers for a particular type of document. Information regarding the registered previewers may be maintained by the preview handler 28, the host application 26, or the operating system 16 regarding the identity and location of the registered previewers. The operating system 16 may store this information in a registry

24. It should be appreciated that the host application 26 may itself be registered as a previewer for various types of documents. Additional details regarding the operation of the host application 26, the preview handler 28, and the previewer 30 will be described below with respect to FIGS. 2-5.

Figure 2:
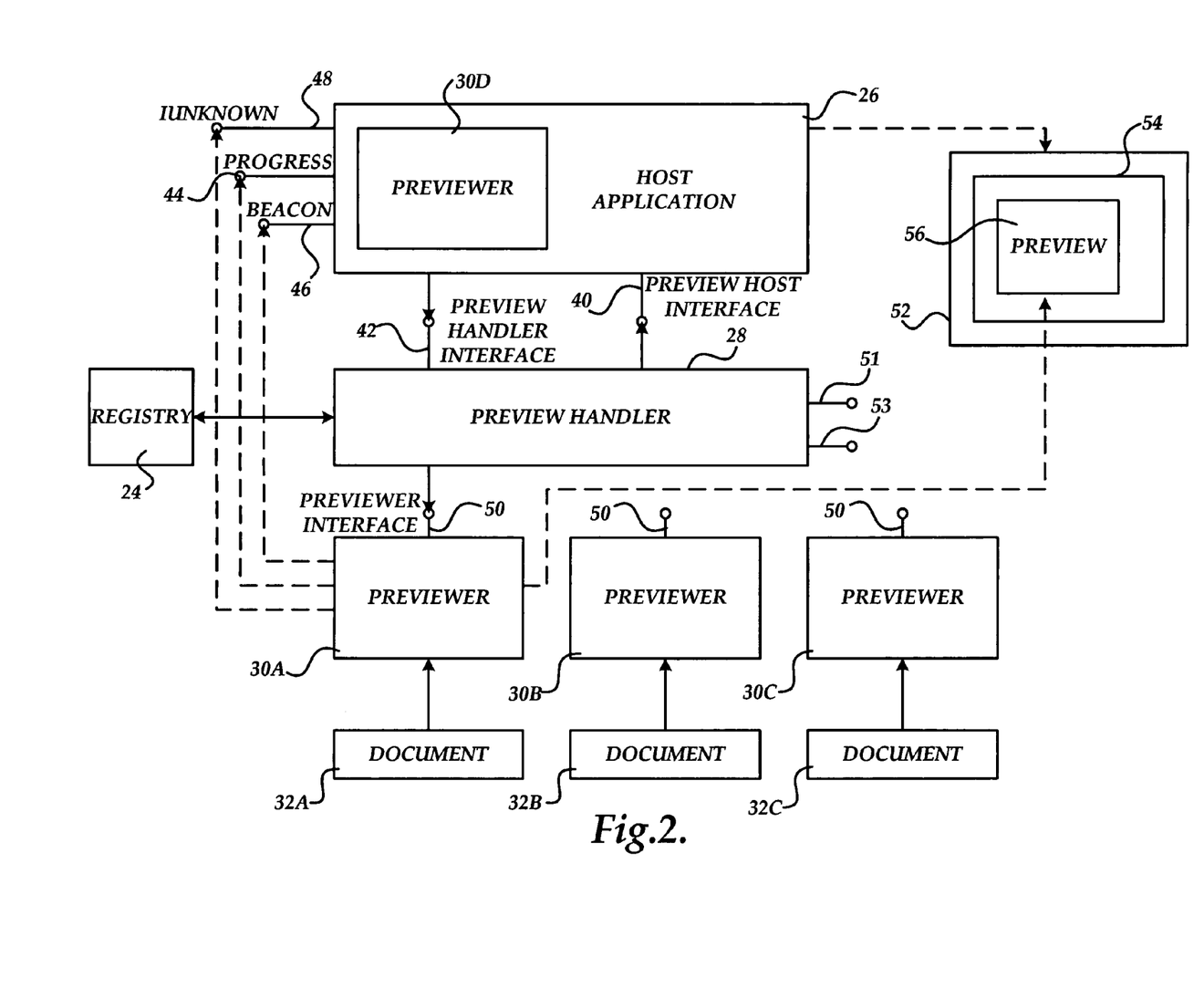
FIG. 2 is a software architecture diagram illustrating aspects of the various software components and interfaces provided by the embodiments of the invention.

Referring now to FIG. 2, additional details will be provided regarding the various software component utilized by the embodiments of the invention. As shown in FIG. 2, the host application 26 communicates with the preview handler 28 through the use of a preview handler interface 42 implemented by the preview handler 28. In turn, the preview handler 28 may communicate with the host application via a preview host interface 40 implemented by the host application. The preview handler 28 may also communicate with the previewers 30A-30D through the use of a previewer interface 50. It should be appreciated that the host application 26 may implement a previewer 30D and communicate with the preview handler 28 in a manner similar to that described herein with respect to the previewers 30A-30C. It should also be appreciated that the preview handler 28 may retrieve values from the registry 24 to identify the proper previewer and its location.

As discussed briefly above, each of the previewers 30A-30C is operative to generate a preview for one or more document types. The documents 32A-32C are typically stored on the mass storage device 14 in a location that is accessible to the previewers 30A-30C. This location is passed to the previewers 30A-30C when a request to load is issued by the preview handler 28. This process will be described in greater detail below.

The previewers 30A-30C may communicate directly with the host application 26 through the use of one or more optional interfaces. In particular, the progress interface 44 may be utilized to provide a progress indicator to the host application 26. The progress indicator may then be displayed to a user to provide, for instance, a graphical indication of the progress of the preview display. The beacon interface 46 may be utilized by the previewers 30A-30C to obtain permission from the host application 26 to load supporting files associated with a document. For instance, if the document to be previewed is a hypertext markup language ("HTML") document, it may be necessary to load graphics and other referenced files to provide the preview. Prior to loading the referenced files, the previewer may request authorization from the host application 26 to do so through the beacon interface 46. The IUnknown interface 48 may be utilized by the previewers 30A-30C to provide interfaces for performing a variety of functions, such as locating supporting files needed to generate a preview of a document. As known to those skilled in the art, the IUnknown interface 48 lets clients get pointers to other interfaces on a given object.

In order to provide the preview, the host application 26 passes a handle to a window 52 to the preview handler 28. The preview handler then creates a child window (or sub-window) inside the window created by the host application. The handle to the child window is then passed to the appropriate previewer 30A-30C when the previewer has been identified and instantiated. In order to render the preview 56 within the window, the previewer creates a sub-window 54 within the window 52. Because user input directed for the preview will be received by the previewer, the previewer may be operative to process certain types of input and to pass other types of input up to the preview handler 28, and subsequently to the host application 26. In this manner, input received by the previewer that is actually intended for the host application 26 may be processed by the host application 26.

Still referring to FIG. 2, additional details regarding the preview handler interface 42, the preview host interface 40, and the previewer interface 50 will be provided. The preview handler interface 42 provides an "initialize" method that is called after the host application 26 creates an instance of the preview handler 28. The initialize method allows the preview handler 28 to initialize itself on the window 52. The parameters passed to the initialize method are the hinstance of the host application 26, a pointer to the preview host interface 40, and one or more flags that may be utilized to define the operation of the preview handler 28. A set window method may also be provided on the interface 42 that takes the handle to the window 52 into which the preview should be rendered.

The preview handler interface 42 also provides a "load" method. The load method is called by the host application 26 when a request is received to generate a document preview, such as when a user selects a file or set of files they want to preview. When this method is called, the preview handler 28 saves the name or names of the files to preview and calls a background thread to preview the file. The background thread then ensures that there is actually a file to preview, obtains the extension for the file, and attempts to locate a previewer 30A-30C for the extension. If a previewer is located, it is utilized to preview the file. The load method takes the full path to the file to preview as a parameter. Additional details regarding the operation of the load method will be provided below.

The preview handler interface 42 also includes a "show" method. The show method is called by the host application 26 after a file has successfully been loaded into the previewer by a call to the load method. If the host application 26 wants to have the file rendered into a preview, it calls the show method. The preview handler interface 42 also includes a "show error message" method. The show error message method is called if the load or show methods have returned an error code and the host application 26 wants the preview handler 28 to display an error message for the code. The show error message takes the error code and the file name of the file that could not be loaded or shown as parameters.

The preview handler interface 42 also includes a "window changed" method. This method is called when the window 52 that was passed to the set window method changes in some way. For instance, if the size of the window 52 changes, the host application 26 may call this method to inform the preview handler 28 of the change. The preview handler 28 may then call the appropriate previewer to update the size of the sub-window 52 and the preview 56. The preview handler interface 42 also includes an "uninitialize" method that may be called when no additional files remain to be previewed. The uninitialize method uninitializes the preview handler 28.

The preview host interface 40 is an optional callback interface that the host application 26 implements to allow the preview handler 28 to make use of resources that may be available to the host application 26. For instance, if the host application 26 has already loaded a previewer for a particular document type, it may be useful for the host application 26 to pass the interface to the loaded previewer rather than having the preview handler 28 try to load the previewer itself.

The preview host interface 40 provides a "get previewer" method. This method may be called by the preview handler 28 when the preview handler 28 is trying to locate a previewer for a file. Through the get previewer method, the preview handler 28 can ask the host application 26 for the identity of a previewer for the file type. The get previewer method takes as input the extension of the file to be previewed and provides an output parameter indicating the identity of the previewer for the file type or NULL. This method may be useful for instance when the host application 26 has already loaded the previewer or when the host application 26 provides the previewer 30D itself.

If the get previewer method does not return a previewer, the preview handler 28 may utilize a "get previewer class ID" method provided by the preview host interface 40. Through the get previewer class ID method, the host application 26 can pass to the preview handler 28 the class ID for any previewers that it wants to use for a particular file of a given extension. For example, a host application 26 may want to specify that a particular previewer be utilized for a particular extensible markup language ("XML") file. The get previewer class ID method takes as input the extension of the file to be previewed and provides an output parameter indicating the class ID of the previewer for the file type or NULL.

The preview host interface 40 also provides a "get interface" method. When the preview handler 28 is instructed to load a file, it attempts to get pointers to the beacon interface 46, the progress interface 44, and the IUnknown interface 48 to pass to the previewer for use during load and show. The get interface method is utilized for this purpose. The get interface method takes as parameters the identity of the interface that is being requested and returns as an output parameter the pointer to the requested interface if it is returned.

The preview host interface 40 also provides a "done loading" method. When the previewer is done loading a file, this method may be called to let the host application 26 know that the next step may be taken. For instance, in response to receiving a call to the done loading method, the host application 26 may call the show method on the preview handler interface 42. Alternatively, if the document could not be loaded, the done loading method may be called with an error message. In this case, the host application 26 may call the "show error message" method on the preview handler interface 42.

The previewer interface 50 is the base interface for the previewers 30A-30D to implement. By implementing this interface, a previewer may be called to load a file, render that file to a sub-window, provide intra-document navigation if desired, and unload the file when the preview is finished. Previewers may be invoked on a background thread and should also attempt to load and render as fast as possible since the user may be waiting on the preview.

The previewer interface 50 exposes a "load" method that is called to initialize a previewer on a particular file. The load method takes as parameters the path to the document to be previewed and optional pointers to the beacon interface 46, the progress interface 44, and the IUnknown interface 48. These interfaces may be utilized in the manner described above.

When loading a document in response to a call to the load method, the previewer should not invoke any user interface, such as progress dialogs, etc. The document should not be locked for writing and the previewer should not change or update the document in any way. The previewer should also fail silently if the document is password protected. The previewer should also not execute any macros contained in the document. The previewer should also be designed such that the load method may be called once and the "show" method (discussed below) may be called many times with potentially different windows. The load method should perform any time-consuming work involved in preparing the file to be rendered, so the "show" method can be as fast as possible. If the user tries to cancel the preview, the load method should stop loading the file and return as quickly as possible.

As discussed briefly above, the previewer interface 50 also exposes a "show" method. This method is called to have the previewer render the document passed to the load method into the specified window. This is a separate method from the load method to allow for a viewer to load a file without requiring that it also render the file to a window. The show method takes as a parameter a handle to the window where the preview should be rendered.

The previewer interface 50 also exposes a "window changed" method. This method is called to let the previewer know that the window it is currently using has changed somehow. This method is typically called in response to a call to the window changed method on the preview handler interface 42. The previewer interface 50 also exposes an "unload" method. This method is called to let a previewer know that it should unload the file that was loaded via the load method. Additional details regarding the use and operation of the various methods provided by the preview handler interface 42, the preview host interface, and the previewer interface 50 will be described in greater detail below with reference to FIGS. 3-5.

According to embodiments of the invention, the preview handler 28 may also support the IService Provider interface 51 or the IOle CommandTarget Interface 53. The interface 51 is a pre-existing interface that allows a component to expose unrelated functionality. Through the interface 51, the host application 26 can ask the current previewer if it supports certain types of functionality. The interface 53 is another pre-existing interface that allows a caller (the host 26) to issue commands to the client (the previewers). The preview handler 28 implements this interface as a pass-through to the current previewer.

Figure 3:
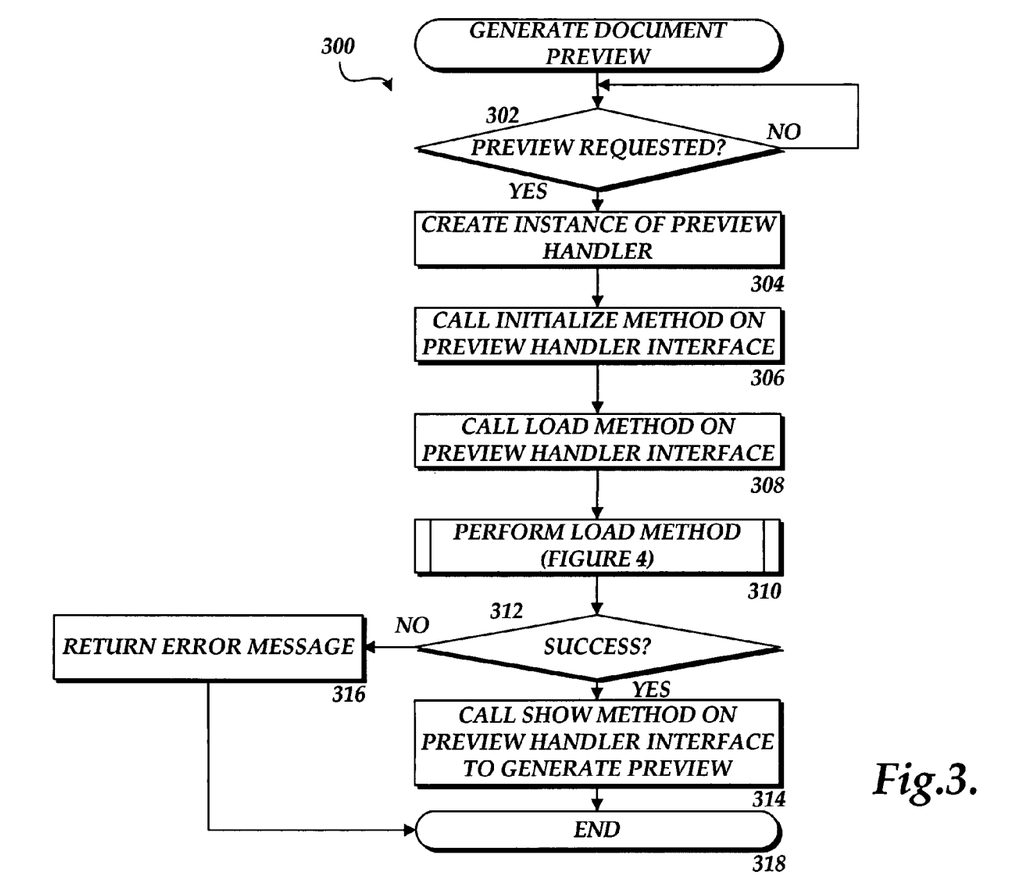
FIGS. 3-7 are flow diagrams illustrating the operation of the various software components provided by the embodiments of the invention for providing a document preview.

Referring now to FIG. 3, an illustrative routine 300 will be described illustrating a process for providing a document preview. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3-5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 302, where a determination is made as to whether a request has been received to generate a preview of one or more documents. Such a request may be made, for instance, by a user selecting an e-mail message having one or more documents attached. Alternatively, such a request may be made programmatically by an operating system or other type of program. If a preview request has not been received, the routine 300 returns back to operation 302, where another such determination is made. If a request has been received, the routine 300 continues from operation 302 to operation 304.

At operation 304, the host application 26 creates an instance of the preview handler 28. The routine 300 then continues to operation 306, where the host application 26 calls the initialize method on the preview handler interface 42. In response to receiving the call to the initialize method 26, the preview handler 28 initializes itself in the manner described above. The set window method may also be called with a handle to the window in which the preview should be generated.

From operation 306, the routine 300 continues to operation 308, where the host application 26 calls the load method on the preview handler interface 42. In response to receiving a call to the load method, the preview handler 28 attempts to identify a previewer for the particular type of document to be previewed, to load the previewer, and to instruct the previewer to load the document. This process occurs at operation 310. An illustrative routine 400 will be described below with respect to FIG. 4 for locating the previewer and loading the document.

From operation 310, the routine 300 continues to operation 312, where a determination is made as to whether the previewer was identified and was able to load the specified document. If the previewer could not load the document, the routine 300 branches to operation 316, where an error message is returned to the host application 26 by a call to the done loading method on the preview host interface 40 with an error message. In response to such an error, the host application 26 may call the show error message method on the preview handler interface 42. From operation 316, the routine 300 continues to operation 318, where it ends.

If, at operation 312, it is determined that the previewer was able to load the document, the routine 300 continues to operation 314, where the done loading method on the preview host interface 40 may be called with a success message. In response to receiving such a message, the host application 26 may call the show method on the preview handler interface 42. In response, the preview handler 28 may call the show method on the previewer interface 50 to cause the previewer to display the preview in the sub-window 54. When the preview is no longer needed, the various uninitialize methods may be called to uninitialize the previewer and the preview handler 28. An illustrative routine 500 is described below with respect to FIG. 5 for uninitializing these components. From operation 314, the routine 300 continues to operation 318, where it ends.

Figure 4:
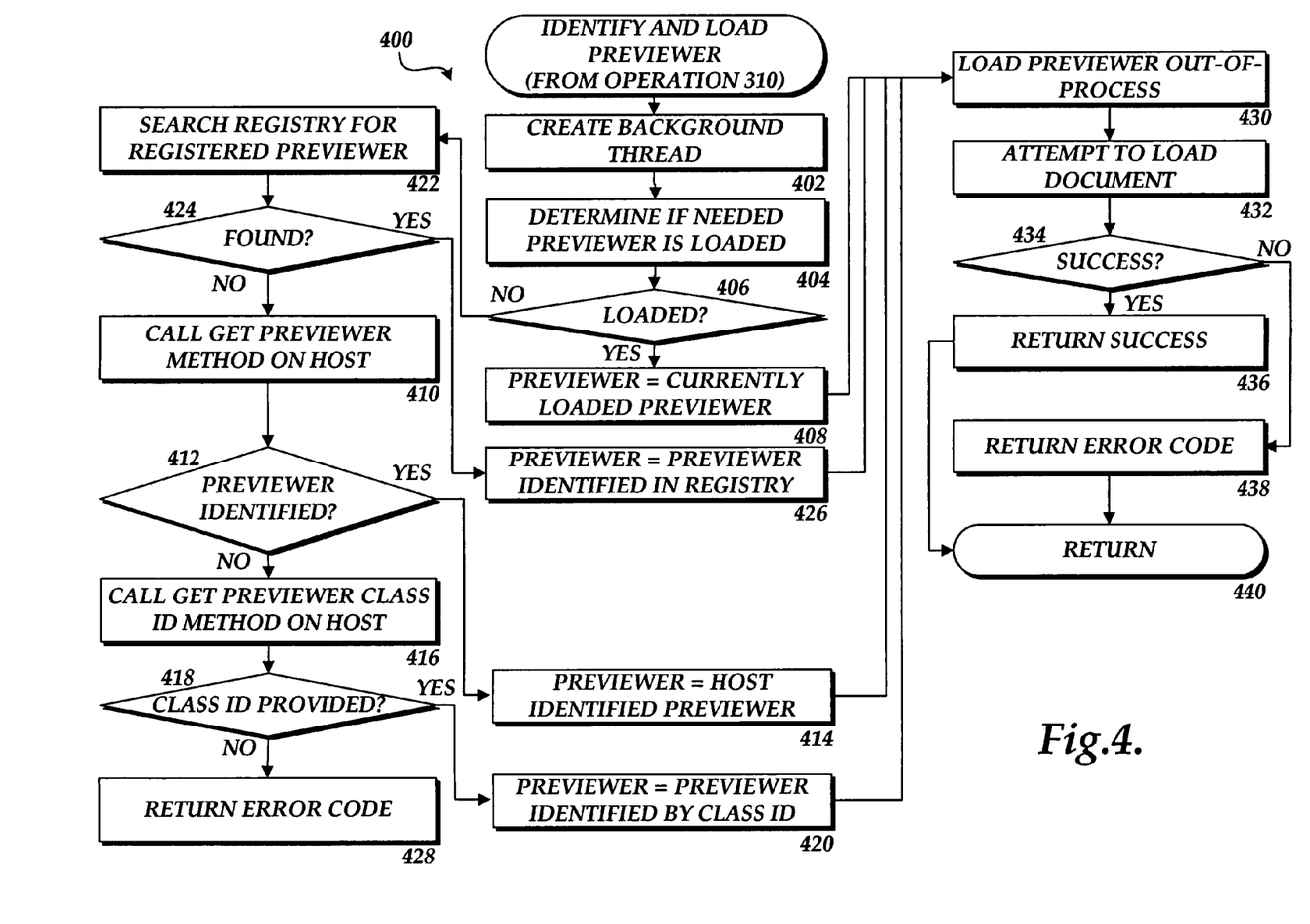

Turning now to FIG. 4, an illustrative routine 400 will be described for identifying and loading the proper previewer for a document. The routine 400 begins at operation 402, where a background thread is created for communicating with the previewer. A background thread is utilized so that a new background thread may be created and utilized in the event that the previewer becomes unresponsive. This also allows the host application 26 to stay responsive while the preview handler 28 waits for a previewer to load and render a file. This allows for the preview handler 28 to handle the case where a user decides they do not want to preview a file that they have requested to preview. For example, if the user selects a spreadsheet file and, while the previewer is loading the file, the user decides that they really want to preview an image, they can select the image in the host application 26. The preview handler 28 can quickly determine if the existing background thread is in a state where it can load a previewer for the image. If it is not, the preview handler 28 can load a background thread for the image previewer and load the preview of the image without waiting for the spreadsheet file to finish loading.

From operation 402, the routine 400 continues to operation 404, where a determination is made as to whether the needed previewer is already loaded. In order to improve performance, the preview handler 28 may leave previewers in memory for some period of time after they are needed. In this manner, the previewers are effectively cached and the load time may be saved during a subsequent request for the previewer. At operation 406, if the previewer is already loaded, the routine 400 continues to operation 408, where the currently loaded previewer is designated as the previewer for the document to be previewed. If the needed previewer is not loaded, the routine 400 branches from operation 406 to operation 422.

At operation 422, a search is made of the registry 24 to determine if a previewer has registered itself as a previewer of the particular document file type. If a previewer is identified in the registry, the routine 400 branches to operation 426, where the previewer identified in the registry is designated as the previewer for the document. If no previewer is found in the registry, the routine 400 continues to operation 410.

At operation 410, the preview handler 28 calls the get previewer method on the preview host interface 40. As discussed above, the get previewer method allows the preview handler 28 to request the identity of the previewer from the host application 26. If, at operation 412, it is determined that the host has identified the previewer in response to the call to the get previewer method, the routine 400 branches to operation 414, where the identified previewer is designated as the previewer for the document. If the host application 26 does not designate a previewer, the routine 400 continues to operation 416.

At operation 416, a call is made to the get previewer class ID method on the preview host interface 40. If the host application 26 returns the class ID of a previewer in response to the call, the method 400 branches from operation 418 to operation 414, where the previewer identified by the class ID is designated as the previewer for the current document. Otherwise, the routine 400 continues from operation 418 to operation 428, where an error message is returned.

From operations 408, 414, 420, and 426, the routine 400 continues to operation 430. At operation 430, the designated previewer is loaded as an out-of-process object on the background thread. The routine 400 then continues to operation 432 where an attempt is made by the previewer to load the document and build the preview. The routine 400 then continues to operation 434, where a determination is made as to whether the document was loaded successfully. If the document was not loaded successfully, the routine 400 branches from operation 434 to operation 438 where an error message is returned. If the document is loaded successfully, the routine 400 continues to operation 436, where a success message is returned. From operations 436 and 438, the routine 400 continues to operation 440, where it returns.

Figure 5:
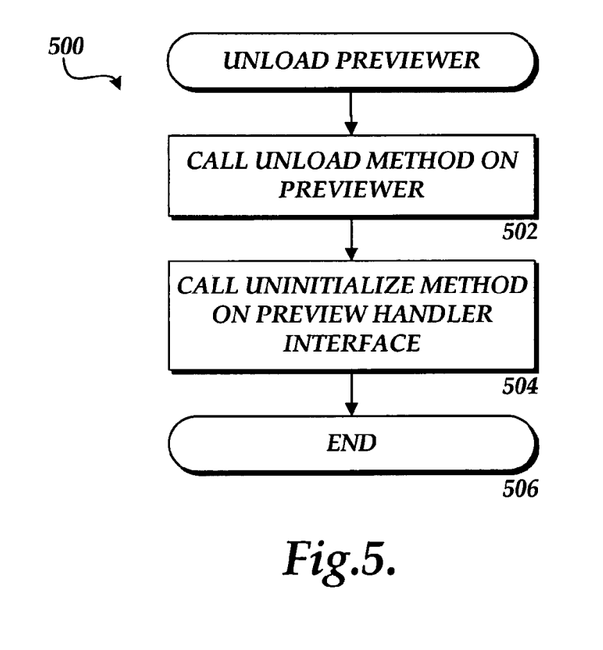

Referring now to FIG. 5, an illustrative routine 500 will be described for unloading the previewer and the preview handler 28. The routine 500 begins at operation 502, where the preview handler 28 calls the unload method on the previewer. In response to receiving such a call, the previewer unloads the document and uninitializes itself. The routine 500 then continues to operation 504, where the uninitialize method is called on the preview handler interface 28. This call causes the preview handler to uninitialize itself. From operation 504, the routine 500 continues to operation 506, where it ends.

Figure 6:
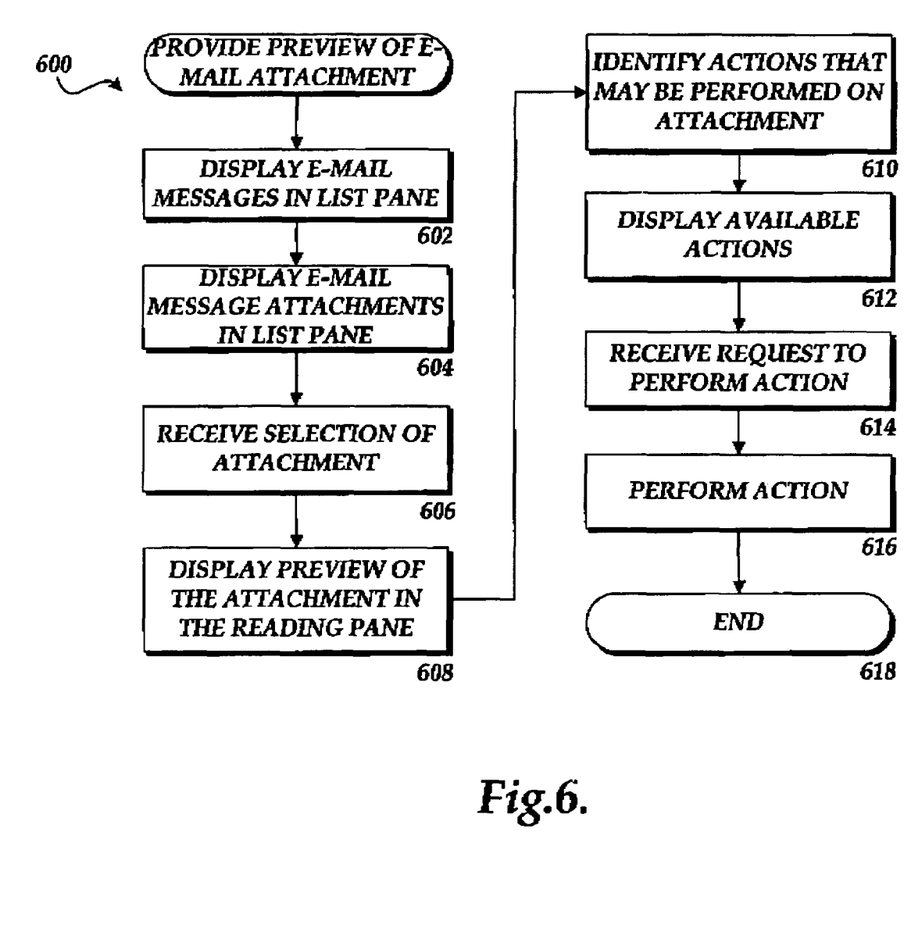

Referring now to FIG. 6, an illustrative routine 600 will be described illustrating a process performed by an e-mail client application for previewing and performing actions on attachments to e-mail messages. It should be appreciated that although the embodiments of the invention described herein are presented in the context of the e-mail client application program, the invention may be utilized in other types of application programs.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 6-5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 600 begins at operation 602, where the e-mail client application displays e-mail messages in a list pane. The routine 600 then continues to operation 604 where the documents attached to the e-mail messages shown in the listpane are also displayed. The attachments may be displayed in the manner described above with respect to FIG. 2. From operation 604, the routine 600 continues to operation 606.

At operation 606, the e-mail client application receives the user selection of an attachment to an e-mail message. In response to the selection, the e-mail client application 24 instructs a preview handler to identify a previewer for the attachment and to generate a preview of the attachment. The generated preview is then displayed by the e-mail client application in the reading pane at operation 608. From operation 608, the routine 600 continues to operation 610.

At operation 610, the e-mail client application identifies the actions that may be performed on the attachment. User interface objects, such as buttons, are then displayed for the identified actions adjacent to a preview. This occurs at operation 612. From operation 612, the routine 600 continues to operation 614, where a request is received from the user to perform one of the displayed actions. The request may be made, for instance, through a selection of one of the displayed user interface objects. The routine 600 then continues to operation 616, where the requested operation is performed. From operation 616, the routine 600 continues to operation 618, where it ends.

Figure 7:
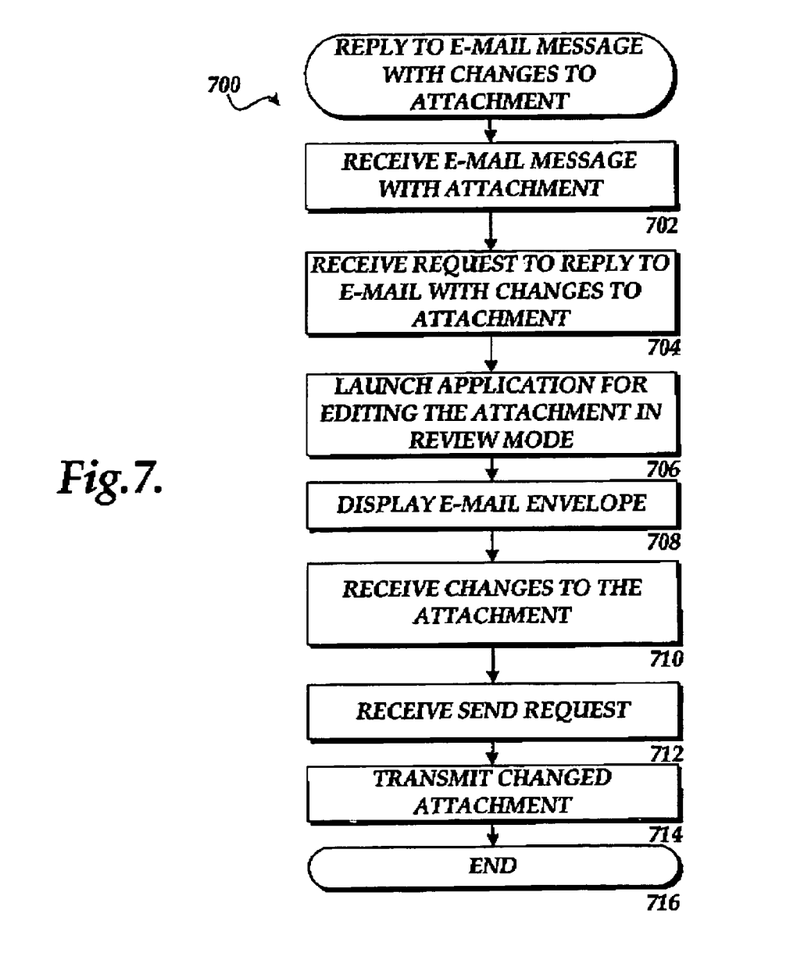

Turning now to FIG. 7, an illustrative routine 700 will be described for performing an action for replying to an e-mail message with changes to an attached document. The routine 700 begins at operation 702, where an e-mail message having an attachment is received by the e-mail client application. From operation 702, the routine 700 continues to operation 704, where a request is receive to reply to the original e-mail with changes to the attached document. This request may be made for instance, through a user selection of one of the actions associate with a preview. From operation 704, the routine 700 continues to operation 706.

At operation 706, the e-mail client application launches an application program associated with the attachment. For instance, if the attachment comprises a word processing document, the e-mail client application may launch a word processing application for editing the document. The application program may also be launched in a state specifically designated for reviewing and modifying documents. Such a state is commonly referred to as a "review" mode and provides functionality for making document modifications in a manner that allows the modifications to be easily identified and read by another user.

As described briefly above, the application program may also be launched in a manner to cause a "reply with changes" button to be displayed In conjunction with the editing screen. This occurs at operation 706 and allows a user to easily and quickly transmit the changed document as a reply to the original e-mail message. From operation 708, the routine 700 continues to operation 708, where changes to the attached document are received from the user. The routine 700 then continues to operation 710, where a request is received from the user to transmit the reply e-mail message including the changed document through the selection of the button.

In response receiving the request to transmit the reply e-mail including the changed document, the routine 700 continues to operation 712 where a reply message is created with the changed document attached. The user can then add comments. If the user indicates the message should be ne continues to operation 716, where the e-mail client application transmits the reply e-mail with the changed document attached. The application program is closed and the user is returned to the display provided by the e-mail client application. The user may then preview other documents and interact with the e-mail client application in the manner described herein. From operation 714, the routine 700 continues to operation 718, where it ends.

Based on the foregoing, it should be appreciated that the various embodiments of the invention include a method, system, apparatus, and computer-readable medium for providing a document preview. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for providing a document preview on a computer, the method comprising:

calling a preview handler by an electronic mail client application running on the computer;

receiving a request at the preview handler from the electronic mail client application to generate a visual preview of an attached document of an electronic mail message;

in response to receiving the request, the preview handler transmitting a query including a file extension of the attached document to the electronic mail client application, receiving a response to the query from the electronic mail client application, and identifying a previewer for a document type of the attached document for generating the visual preview of the attached document from a plurality of separately executable previewers based on a response to the query received from the electronic mail client application, wherein:

each previewer of the plurality of previewers is separately executable from each other previewer and is registered with the preview handler as a previewer for previewing documents of a particular document type, and the plurality of previewers includes at least one of a word processor application program and a spreadsheet application program that is registered with the preview handler as a previewer for previewing documents of the document type of the attached document, capable of providing the visual preview of the attached document, and capable of being launched by the electronic mail client application for editing the attached document;

in response to identifying the word processor application or the spreadsheet application as the previewer for the document type of the attached document, the preview handler loading the word processor application or the spreadsheet application as the previewer for the document type of the attached document for providing the visual preview of the attached document;

in response to the preview handler loading the word processor application or the spreadsheet application as the previewer for the document type of the attached document, the electronic mail client application designating the word processor application or the spreadsheet application as a loaded previewer for generating visual previews of other documents of the document type of the attached document; and transmitting a request from the preview handler to the loaded previewer instructing the loaded previewer to load the attached document and to generate the visual preview of the attached document, wherein the loaded previewer provides one or more interfaces for receiving user input and allowing the visual preview of the attached document to be paged through and navigated.

2. The method of claim 1, further comprising:

receiving, from the electronic mail client application, a handle to a window created by the electronic mail client application in which the visual preview of the attached document should be generated;

creating, by the preview handler, a sub-window within the window created by the electronic mail client application;

passing, to the loaded previewer, a handle to the sub-window; and displaying, by the loaded previewer, the visual preview of the attached document within the sub-window created by the preview handler.

3. The method of claim 1, wherein the response to the query provided by the electronic mail client application comprises a previewer class identifier for identifying the previewer for the document type of the attached document.

4. The method of claim 3, wherein the preview handler identifies the previewer for the document type of the attached document from the plurality of separately executable previewers by searching contents of a registry.

5. The method of claim 1, further comprising:

determining whether the attached document was successfully loaded; and in response to determining that the attached document was not successfully loaded, returning an error message from the preview handler to the electronic mail client application.

6. The method of claim 5, further comprising:

receiving a request at the preview handler from the electronic mail client application to display a message corresponding to the error message; and displaying the message by the preview handler in response to the request.

7. The method of claim 6, further comprising:

receiving from the electronic mail client application at the preview handler a pointer to a progress interface;

passing the pointer to the progress interface from the preview handler to the loaded previewer; and transmitting progress messages from the loaded previewer to the electronic mail client application via the progress interface.

8. The method of claim 6, further comprising:

in response to determining that the attached document was not successfully loaded, the preview handler querying the electronic mail client application for the location of additional files necessary to generate the visual preview of the attached document.

9. The method of claim 6, further comprising:

receiving from the electronic mail client application at the preview handler a pointer to a beacon interface;

passing the pointer to the beacon interface from the preview handler to the loaded previewer; and in response to determining that the attached document was not successfully loaded, the preview handler querying the electronic mail client application for permission to load supporting files necessary to generate the visual preview of the attached document on the beacon interface.

10. A computer-readable storage medium having computer-executable instructions stored thereon which, when executed by a computer, will cause the computer to expose a preview handler interface to an electronic mail client application, the preview handler interface to expose at least one method for initializing a preview handler and loading a previewer for generating a document preview, the preview handler to:

receive a request from the electronic mail client application to generate a visual preview of an attached document of an electronic mail message;

transmit a query including a file extension of the attached document to the electronic mail client application in response to the request;

receive a response to the request from the electronic mail client application;

identify a previewer for the document type of the attached document for generating the visual preview of the attached document from a plurality of separately executable previewers based on the response to the query provided by the electronic mail client application, wherein:

each previewer of the plurality of previewers is separately executable from each other previewer and is registered with the preview handler as a previewer for previewing documents of a particular document type, and the plurality of previewers includes at least one of a word processor application program and a spreadsheet application program that is registered with the preview handler as a previewer for previewing documents of the document type of the attached document, capable of providing the visual preview of the attached document, and capable of being launched by the electronic mail client application for editing the attached document;

load the word processor application or the spreadsheet application as the previewer for the document type of the attached document for providing the visual preview of the attached document, wherein the word processor application or the spreadsheet application is designated by the electronic mail client application as a loaded previewer for generating visual previews of other documents of the document type of the attached document when loaded; and transmit a request to the loaded previewer instructing the loaded previewer to load the attached document and to generate the visual preview of the attached document, wherein the loaded previewer provides one or more interfaces for receiving user input and allowing the visual preview of the attached document to be paged through and navigated.

11. The computer-readable storage medium of claim 10, wherein the preview handler calls an interface exposed by the electronic mail client application and receives a response from the electronic mail client application comprising an identity of a previewer for the document type of the attached document.

12. The computer-readable storage medium of claim 10, wherein the preview handler calls an interface exposed by the electronic mail client application and receives a response from the electronic mail client application comprising a previewer class identifier for identifying the previewer for the document type of the attached document.

13. The computer-readable storage medium of claim 12, the preview handler to search a registry for identifying the previewer for the document type of the attached document from the plurality of separately executable previewers.

14. The computer-readable storage medium of claim 10, wherein the preview handler interface comprises a first show method for showing the visual preview of the attached document.

15. The computer-readable storage medium of claim 14, wherein:
the loaded previewer comprises a previewer interface comprising a second show method for showing the visual preview of the attached document, and
the preview handler is to call the second show method on the previewer interface in response to receiving a call to the first show method on the preview handler interface.

16. A computer-implemented method for providing a document preview on a computer, the method comprising:
exposing a preview host interface at an electronic mail client application running on the computer, the preview host interface comprising:
a get previewer method through which a preview handler transmits a query to the electronic mail client application and receives a response to the query from the electronic mail client application, the preview handler transmitting the query in response to receiving a request from the electronic mail client application to generate a visual preview of an attached document of an electronic mail message, the query including a file extension of the attached document for requesting the electronic mail client application to identify a previewer designated by the electronic mail client application for generating the visual preview of the attached document based on the file extension of the attached document, the response to the query from the electronic mail client application comprising an identity of a previewer if the electronic mail client application designates a previewer for the document type of the attached document,
a get previewer class identifier method through which the preview handler may transmit a subsequent query to the electronic mail client application if the get previewer method does not return an identity of a previewer, the response to the subsequent query from the electronic mail client application comprising a previewer class identifier if the electronic mail client application does not designate a previewer for the document type of the attached document, wherein:
the preview handler is to identify a previewer for the document type of the attached document for generating the visual preview of the attached document from a plurality of separately executable previewers based on the response from the electronic mail client application,
each previewer of the plurality of previewers is separately executable from each other previewer and is registered with the preview handler as a previewer for previewing documents of a particular document type, and
the plurality of previewers includes at least one of a word processor application program and a spreadsheet application program that is registered with the preview handler as a previewer for previewing documents of the document type of the attached document, capable of providing the visual preview of the attached document, and capable of being launched by the electronic mail client application for editing the attached document,
a get interface method through which the preview handler may obtain pointers to other interfaces provided by the electronic mail client application, and
a done loading method through which the preview handler may inform the electronic mail client application that the attached document to be visually previewed has been loaded; and
loading the word processor application or the spreadsheet application as the previewer for the document type of the attached document for providing the visual preview of the attached document, wherein:
the word processor application or the spreadsheet application is designated by the electronic mail client application as a loaded previewer for generating visual previews of other documents of the document type of the attached document when loaded, and
the loaded previewer provides one or more interfaces for receiving user input allowing the visual preview of the attached document to be paged through and navigated.

17. The method of claim 16, further comprising exposing a preview handler interface at the preview handler, the preview handler interface comprising:
an initialize method for initializing the preview handler,
a load method for instructing the preview handler to identify a previewer for the document type of the attached document and loading the attached document to be visually previewed into the previewer for the document type of the attached document,
a show method for displaying the visual preview of the attached document,
a window changed method for instructing the preview handler that a window in which the visual preview of the attached document was displayed has changed, and
an uninitialize method for uninitializing the operation of the preview handler.

18. The method of claim 17, further comprising exposing a previewer interface at the previewer, the previewer interface comprising:
a load method for receiving an instruction to load the attached document to be visually previewed,
a show method for displaying an instruction to show the visual preview of the attached document, and
a window changed method for receiving an indication that the window in which the visual preview of the attached document is displayed has changed.

19. The method of claim 18, wherein the load method on the previewer interface is called by the preview handler in response to receiving a call to the load method on the preview handler interface.

20. The method of claim 18, wherein the show method on the previewer interface is called by the preview handler in response to receiving a call to the show method on the preview handler interface.

21. The method of claim 18, wherein the window changed method on the previewer interface is called by the preview handler in response to receiving a call to the window changed method on the preview handler interface.

22. The method of claim 1, further comprising:
launching the word processor application or the spreadsheet application that was loaded as the previewer for the document type of the attached document in order to edit the attached document in response to user input received while the visual preview of the attached document is displayed; and
receiving changes to the attached document from a user.

23. A computer-implemented method for providing a document preview on a computer, the method comprising:
providing a preview handler callable by an electronic mail client application running on the computer, the preview handler to:
receive a request from the electronic mail client application to generate a visual preview of the attached document,
transmit a query including a file extension of the attached document to the electronic mail client application,
receive a response to the query from the electronic mail client application,
identify a previewer for a document type of the attached document for generating the visual preview of the attached document from a plurality of separately executable previewers based on the response to the query received from the electronic mail client application, wherein:
each previewer of the plurality of previewers is separately executable from each other previewer and is registered with the preview handler as a previewer for previewing documents of a particular document type, and
the plurality of previewers includes at least one of a word processor application program and a spreadsheet application program that is registered with the preview handler as a previewer for previewing documents of the document type of the attached document, capable of providing the visual preview of the attached document, and capable of being launched by the electronic mail client application for editing the attached document, and
load the word processor application or the spreadsheet application as the previewer for the document type of the attached document for providing the visual preview of the attached document, wherein:
the word processor application or the spreadsheet application is designated by the electronic mail client application as a loaded previewer for generating visual previews of other documents of the document type of the attached document when loaded, and
the loaded previewer provides one or more interfaces for receiving user input allowing the visual preview of the attached document to be paged through and navigated; and
launching the word processor application or the spreadsheet application that was loaded as the previewer for the document type of the attached document in order to edit the attached document in response to user input received while the visual preview of the attached document is displayed.

24. The method of claim 23, further comprising launching the word processor application or the spreadsheet application that was loaded as the previewer for the document type of the attached document in a review mode.

25. The method of claim 24, further comprising identifying modifications to the attached document.

26. The method of claim 23, further comprising receiving changes to the attached document from a user.

* * * * *

UNITED STATES PATENT AND TRADEMARK OFFICE
CERTIFICATE OF CORRECTION

| | | |
|---|---|---|
| PATENT NO. | : 8,032,482 B2 | |
| APPLICATION NO. | : 10/954328 | |
| DATED | : October 4, 2011 | |
| INVENTOR(S) | : Jonathan Paul Rosenberg et al. | |

It is certified that error appears in the above-identified patent and that said Letters Patent is hereby corrected as shown below:

In column 11, line 18, after "604" insert -- , --.

In column 11, line 51, after "made" insert --, --.

In column 11, line 67, delete "In" and insert -- in --, therefor.

In column 12, line 9, after "response" insert -- to --.

In column 12, line 13, delete "ne" and insert -- send, the routine --, therefor.

Signed and Sealed this
Twenty-ninth Day of November, 2011

David J. Kappos
*Director of the United States Patent and Trademark Office*